(12) United States Patent
Tseng et al.

(10) Patent No.: US 7,796,195 B2
(45) Date of Patent: Sep. 14, 2010

(54) CIRCUIT FOR ELIMINATING ABNORMAL SOUND

(75) Inventors: Shih-Hua Tseng, Taipei (TW); Wen-Chang Yang, Taipei (TW)

(73) Assignee: Tatung Company, Taipei (TW)

( * ) Notice: Subject to any disclaimer, the term of this patent is extended or adjusted under 35 U.S.C. 154(b) by 1016 days.

(21) Appl. No.: 11/541,740

(22) Filed: Oct. 3, 2006

(65) Prior Publication Data

US 2007/0229717 A1  Oct. 4, 2007

(30) Foreign Application Priority Data

Mar. 29, 2006  (TW) ............................... 95111046 A

(51) Int. Cl.
*H04N 3/24* (2006.01)
*H04N 5/60* (2006.01)
(52) U.S. Cl. ...................................... 348/632; 348/738
(58) Field of Classification Search ................ 348/738, 348/632, 553, 725; 381/71.1, 71.3, 73.1, 381/94.5, 94.8; 455/212, 222, 296, 310; 330/149
See application file for complete search history.

(56) References Cited

U.S. PATENT DOCUMENTS

| 4,600,947 | A | * | 7/1986 | Chamberlain et al. | ........ 348/632 |
| 4,641,190 | A | * | 2/1987 | Testin et al. | ................. 348/632 |
| 5,103,315 | A | * | 4/1992 | Kufta et al. | ................. 348/632 |
| 5,204,973 | A | * | 4/1993 | Sugayama | .................. 455/212 |
| 5,255,094 | A | * | 10/1993 | Yong et al. | .................. 348/632 |
| 7,492,217 | B2 | * | 2/2009 | Hansen et al. | ................. 330/10 |
| 2004/0239418 | A1 | * | 12/2004 | Inagaki | ......................... 330/51 |

* cited by examiner

*Primary Examiner*—Victor Kostak
(74) *Attorney, Agent, or Firm*—Bacon & Thomas, PLLC

(57) ABSTRACT

A circuit for eliminating abnormal sound includes a video/audio processor, a D/A converter, a front-stage mute circuit, a changing delay device, a front-stage amplifier, a back-stage amplifier, a back-stage mute circuit, and a micro control unit. The circuit is mounted in a display device connected to a DVD player. When DVD player plays the video/audio signal having HDMI standard, the display device will generate an abnormal sound (pop voice or declining voice) during performing an operation such as pause, stop or play. Therefore, this circuit uses the changing delay device, the micro control unit, and the mute circuit to filter out the noise for providing a better outputting quality.

8 Claims, 4 Drawing Sheets

CIRCUIT FOR ELIMINATING ABNORMAL SOUND

BACKGROUND OF THE INVENTION

1. Field of the Invention

The present invention relates to a circuit for eliminating abnormal sound and, more particularly, to a processing circuit mount in a display device for eliminating abnormal sound.

2. Description of Related Art

Currently, traditional display device such as a LCD TV can connect to a video/audio player (ex: DVD player), and the video/audio player can show digital video/audio signal of HDMI standard on a display device.

FIG. 1 shows a functional block diagram of a conventional display device. The display device 14 connects to a digital video/audio player (DVD player) 15 and the digital video/audio player 15 outputs a HDMI digital video/audio stream to the display device 14 for displaying the stream data on the display device 14. Due to the HDMI stream comprises both a video signal and an audio signal, the video/audio processor has to perform decoding for outputting the video signal and the audio signal respectively. Therefore, the video signal is transformed into an analog video signal for displaying; the audio signal is transformed into a digital audio signal so as to output to the D/A converter 12 for changing to an analog audio signal.

During displaying the HDMI digital video/audio stream, when user presses a pause button of the digital video/audio player 15, the digital video/audio player 15 will pause to output the video and audio signal, and the video/audio processor will use a form of sill picture to display the video signal on the display device. At this time, there are no audio signals inputted to the video/audio processor 11, therefore the analog audio 19 outputted by the D/A converter 12 will decrease immediately for causing the speaker 16 to generate a pop voice.

In addition, when the user presses the stop button or play button, the digital video/audio player 15 will stop or begin outputting the video/audio signal to the display device 14, and the video/audio signal received by the video/audio processor 11 will change immediately for causing the speaker 16 to generate a declining voice.

From above-mentioned, the display device 14 of prior art can not eliminate the pop voice or the declining voice while the digital video/audio player 15 performs pausing, stopping, or playing. Therefore, it is desirable to provide an improved speech recognition method to mitigate and/or obviate the aforementioned problems.

SUMMARY OF THE INVENTION

The object of the present invention is to provide a circuit for eliminating abnormal sound, which is mounted in a display device. By using the circuit, this present invention will eliminate the pop voice while user presses a pause button on a digital video/audio player. In addition, this present invention also can eliminate the declining voice while the digital video/audio player performs stopping or playing.

To achieve the object, there is provided a circuit for eliminating abnormal sound mounted in a display device. The display device is connected to a digital video/audio player for displaying the video/audio signal of HDMI standard. The circuit for eliminating abnormal sound comprises a video/audio processor, a digital to analog converter, a front-stage mute circuit, a changing delay device, a front-stage amplifier, a back-stage amplifier, a back-stage mute circuit, a micro control unit. The video/audio processor is connected to an output end of the digital video/audio player for receiving the digital video/audio stream to perform decoding, wherein the video signal is transformed into an analog video signal, and the audio signal is transformed into a digital audio signal. The digital to analog converter is connected to the video/audio processor for transforming the digital audio signal into an analog audio signal. The front-stage mute circuit is connected to an output end of the digital to analog converter. The changing delay device is connected between the output end of the digital to analog converter and the input end of the front-stage mute circuit for delaying the changing of analog audio signal outputted by the digital to analog converter so as to use the front-stage mute circuit to filter out noise in the digital audio signal. The front-stage amplifier is connected to an output end of the front-stage mute circuit for outputting the analog audio signal of the front-stage mute circuit. The back-stage amplifier is connected to the output end of the front-stage amplifier. The back-stage mute circuit is connected to the back-stage amplifier and the micro control unit. The micro control unit is connected to the video/audio processor and the back-stage mute circuit for controlling the back-stage mute circuit. As the digital video/audio stream begins changing, the video/audio processor sends an interrupt control signal to the micro control unit, and the micro control unit controls the back-stage mute circuit via interrupt for disabling the back-stage amplifier so as to enter in the mute mode.

In the aforementioned circuit for eliminating abnormal sound, the changing delay device is a metal capacitor, wherein an end of the metal capacitor is connected between the output end of the digital to analog converter and the input end of the front-stage mute circuit, and the other end of the metal capacitor is connected to ground.

In the aforementioned circuit for eliminating abnormal sound, the digital video/audio player is a DVD player.

In the aforementioned circuit for eliminating abnormal sound, the digital video/audio stream conforms to the HDMI standards.

In the aforementioned circuit for eliminating abnormal sound, the display device is a LCD TV, and the LCD TV further comprises a speaker to amplify and output the analog audio signal.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
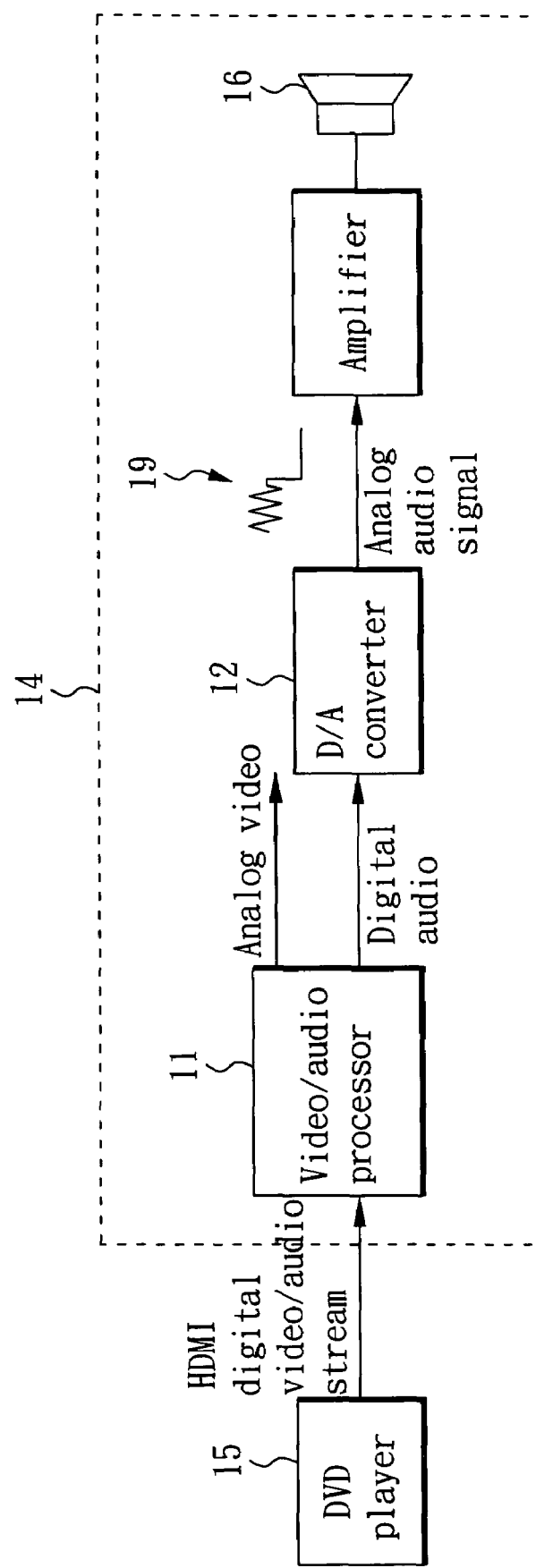
FIG. 1 shows a functional block diagram of a display device of prior art.
Figure 2:
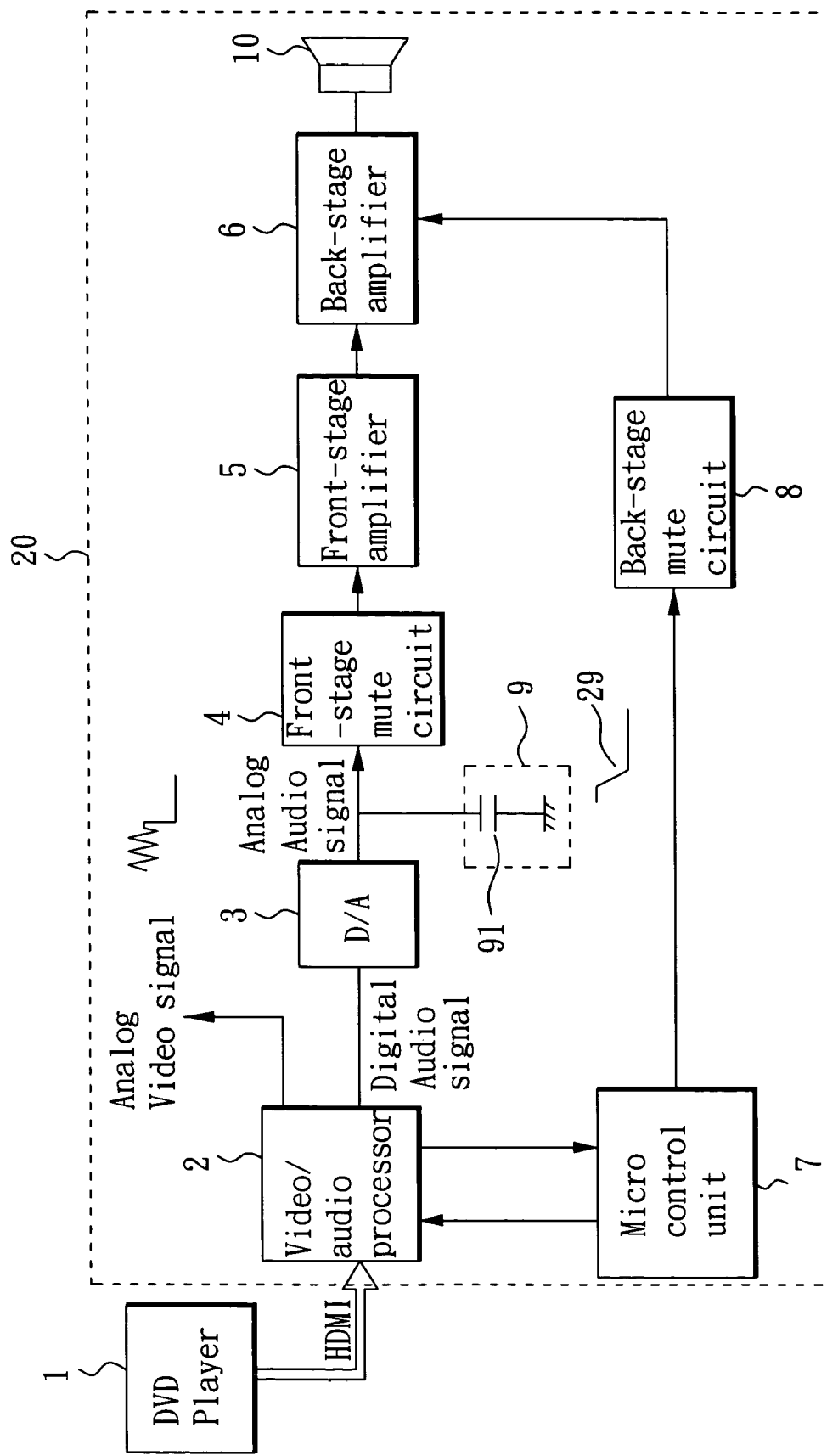
FIG. 2 shows a block diagram for a preferred embodiment of the present invention.

FIG. 2 shows a block diagram for circuit for eliminating abnormal sound in accordance with a preferred embodiment of the present invention. This circuit for eliminating abnormal sound includes a video/audio processor 2, a digital to analog converter (D/A converter) 3, a front-stage mute circuit 4, a front-stage amplifier 5, a back-stage amplifier 6, a changing delay device 9, a back-stage mute circuit 8, and a micro control unit 7. In this embodiment, this circuit for eliminating abnormal sound is mounted in a display device 20 (ex: LCD TV, LCD monitor), wherein the display device 20 further comprises a speaker 10 for outputting an analog audio signal.

In this embodiment, the video/audio player 1 connects to a video/audio processor 2 of the display device 20 and outputs a HDMI video/audio stream including a video signal and an audio signal for being displayed on the display device 20.

Due to the video signal and the audio signal of the HDMI digital, video/audio stream is mutually separated, and thus the video/audio processor 2 has to process the video signal and the audio signal separately during processing the HDMI digital video/audio stream. When the digital video/audio player 1 plays the HDMI digital video/audio stream, the display device 20 will receive HDMI digital video/audio stream including a video signal and an audio signal simultaneously, and the video/audio processor 2 performs decoding for outputting the video signal and the audio signal respectively, wherein, the digital video signal is transformed into an analog video signal for outputting, and the audio signal is transformed into a digital audio signal for outputting.

The micro control unit 7 connects to the video/audio processor 2 for the micro control unit 7 receiving an interrupt control signal. The D/A converter 3 connects to the audio output end of the video/audio processor 2. The front-stage mute circuit 4 connects to the output end of the D/A converter 3. The changing delay device 9 connects between the output end of the D/A converter 3 and the input end of the front-stage mute circuit 4. The D/A converter 3 converts the digital audio signal to an analog audio signal, and the changing delay device 9 receives the analog audio signal for changing delay of the analog audio signal for being outputted to the front-stage amplifier 5 and the back-stage amplifier 6 through the front-stage mute circuit 4 for output on the speaker 10.

In this embodiment, the back-stage mute circuit 8 connects to the back-stage amplifier 6 and the micro control unit 7, and the micro control unit 7 is employed to control the back-stage mute circuit 8.

In this embodiment, with reference to FIG. 2, the changing delay device 9 is a metal capacitor 9. One end of the metal capacitor 91 connects to the output end of the D/A converter 3, the other end connects to ground. Due to the charging/discharging effect, the metal capacitor 91 can change delay time to the analog audio signal.

When user presses a pause button on the digital video/audio player 1, the digital video/audio player 2 will pause to output the video signal and the audio signal, and the video/audio processor will use a form of sill picture to display the video signal on the display device 20. At this time, there are no audio signals inputted to the video/audio processor 2, therefore the analog signal outputted by the D/A converter 3 will decrease immediately for causing the speaker 10 to generate a pop voice.

To prevent from generating the pop voice, this present invention uses the metal capacitor 91 to perform discharging to the analog audio signal. Therefore, the metal capacitor 91 will provide a delay time to output the analog audio signal so as to form a slow changing waveform 29 between the input end of the front-stage mute circuit 4 and the front-stage amplifier 5 for preventing from generating pop voice.

In addition, when the digital video/audio player 1 user presses the stop button or play button, the digital video/audio player 1 will stop or begin outputting the video/audio signal to the display device 20, and the video/audio signal received by the video/audio processor 2 will change immediately for generating a declining voice.

To prevent from generating the declining voice, this present invention uses detection of video signal to control the back-stage mute circuit 8. In FIG. 2, when user presses the stop button or the play button on the digital video/audio player 1 to change the video/audio signal for outputting, the video/audio processor 2 can detect the change of the video/audio signal. The micro control unit 7 also can detect the change of the video/audio signal actively, or the video/audio processor 2 can send an interrupt control signal to remind the micro control unit 7 of the video/audio signal which has been changed. The micro control unit 7 will output a control signal to the back-stage mute circuit 8 after detecting the change of the video/audio signal for starting the back-stage mute circuit 8 so as to control the back-stage amplifier 6 to enter into a mute mode for preventing from generating the declining voice.

In this embodiment, when the video/audio processor 2 sends an interrupt control signal to the micro control unit 7, the micro control unit 7 will use an interrupt service mechanism to drive the back-stage mute circuit 8. In general system, the micro control unit usually uses a polling mechanism of main circuit to detect whether the interrupt signal is occurring or not. Therefore, this present invention has provided more stable and rapid response.

The micro control unit 7 drives the back-stage mute circuit 8 instead of disabling the video/audio processor 2 or driving the front-stage mute circuit 4. When the micro control unit 7 uses the interrupt service mechanism, the audio signal outputted by the video/audio processor 2 has changed already, or the front-stage amplifier 5 has received the audio signal which has been changed, therefore the micro control unit 7 has to drive the back-stage mute circuit 8 for preventing the audio signal from being outputted to the speaker 10.

Figure 3:
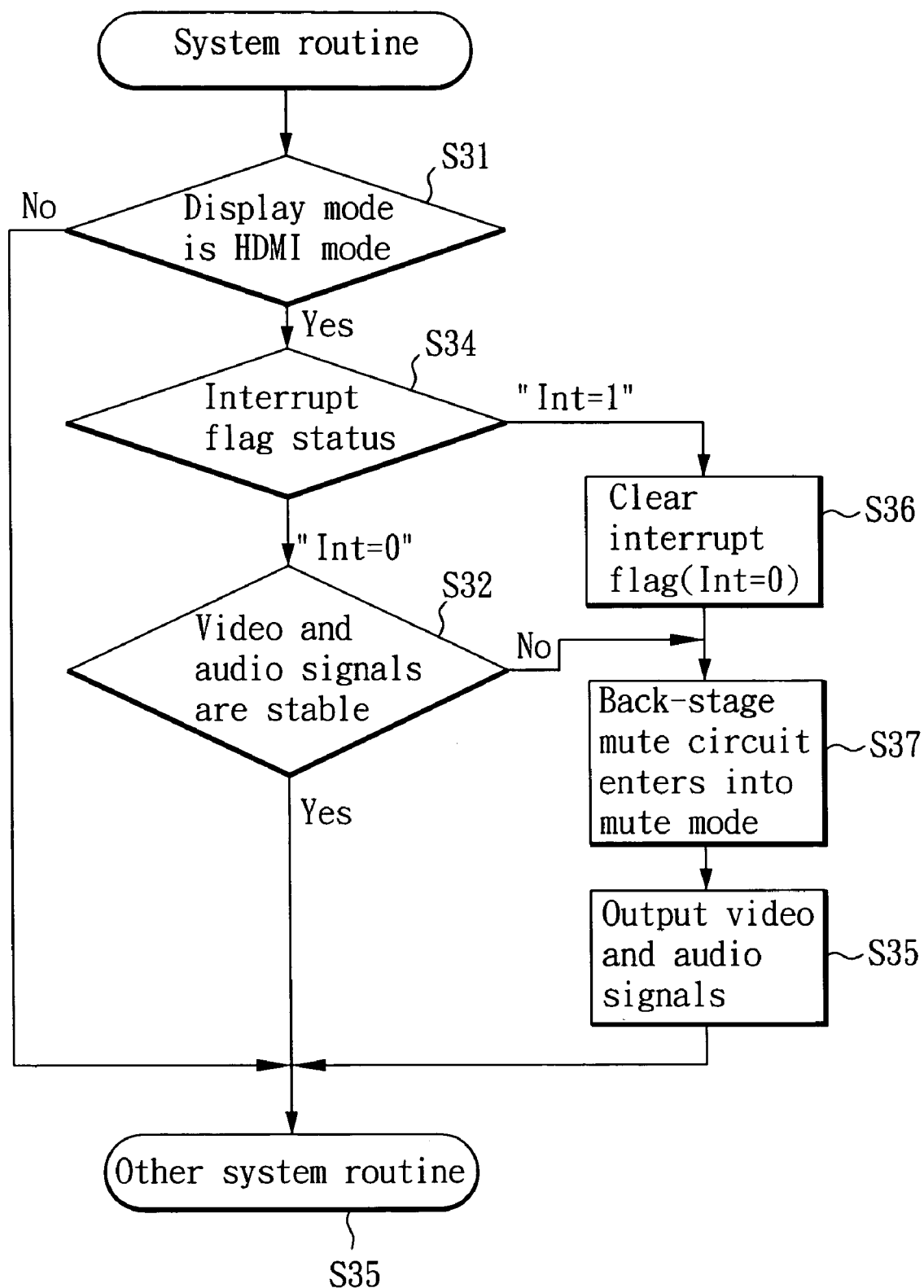
FIG. 3 shows a flowchart for a preferred embodiment of the present invention.
Figure 4:
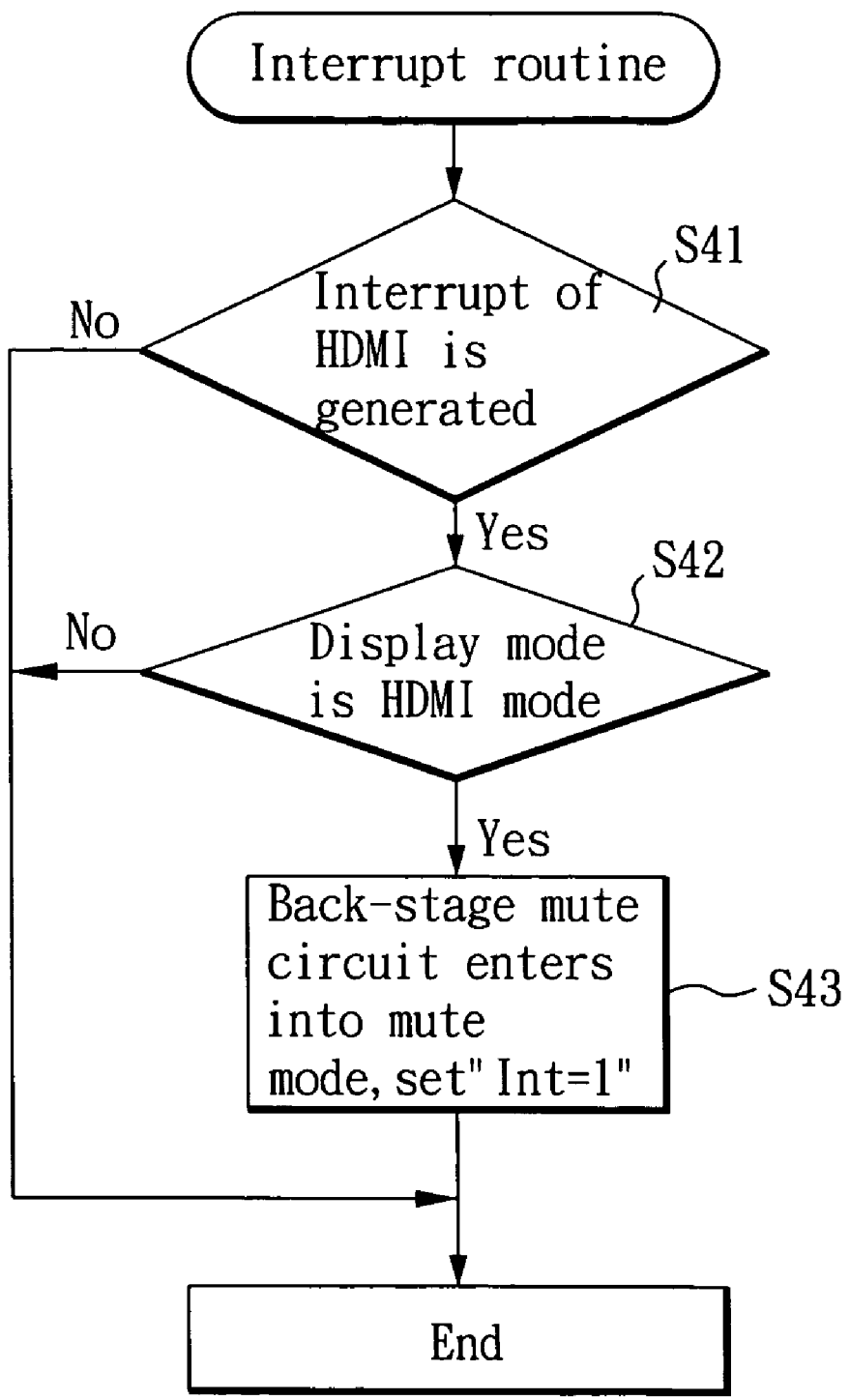
FIG. 4 shows a flowchart for an interrupt subroutine of the present invention.

FIG. 3 and FIG. 4 show a flowchart for a preferred embodiment of the present invention, wherein FIG. 3 illustrates a flowchart of the micro control unit 7 for detecting the video signal and the audio signal so as to start the back-stage mute circuit 8 for eliminating abnormal sound, and FIG. 4 illustrates a flowchart of the micro control unit 7 for starting the interrupt mechanism.

Referring to FIG. 3, firstly, when the display device 20 receives a digital video/audio stream, the display device 20 will determine whether the display mode is a HDMI mode or not. If the display mode is not the HDMI mode, the display mode maybe the AV, SV, TV or other display modes, and the display device 20 performs other system programs.

If the display mode is the HDMI mode, the micro control unit 7 will determine the status of an interrupt flag (step S34). The digital video/audio player 1 uses the video/audio processor 2 to generate an interrupt control signal for starting an interrupt mechanism of the micro control unit 7 so as to set an interrupt flag while the video signal and the audio signal are changing. Therefore, if the status of the interrupt flag is "1", the interrupt mechanism has been executed already. In this time, the micro control unit 7 should clean the status of the interrupt flag to "0" (step S36) for starting the interrupt mechanism again so as to control the back-stage mute circuit 8 to enter into the mute mode.

If the status of the interrupt flag is "0", the micro control unit 7 will determine whether the video signal and the audio signal of the digital stream are stable or not (step S32), wherein the video/audio processor 2 includes a plurality of registers (not shown) for showing the standard frequency status of the video signal and the audio signal which are used to determine whether the video signal and the audio signal are stable or not. While the video signal and the audio signal are stable, the value of the frequency status register will be saved to the micro control unit 7. The micro control unit 7 can capture a frequency status value of the inner register of the video/audio processor 2 for being compared with a stable standard value of the micro control unit 7. If there is significant difference, the video signal and the audio signal are unstable, therefore, the micro control unit 7 will output a control signal to start the back-stage mute circuit 8 for controlling the back-stage amplifier 6 to enter into a mute mode (step S37).

Please refer to FIG. 4, FIG. 4 shows a flowchart for an interrupt subroutine of the present invention. When the video signal and the audio signal suddenly changes, the digital video/audio player 1 uses the video/audio processor 2 to generate an interrupt control signal for starting the interrupt mechanism of the micro control unit 7 and setting the interrupt flag. The flowchart includes steps as follows:

Firstly, the micro control unit 7 determines whether the interrupt of the HDMI is generated or not (step S41), if the interrupt of the HDMI is not generated, the interrupt subroutine will stop executing. If the interrupt of the HDMI is generated, the display device 20 will determine whether the display mode is the HDMI mode or not (step S42), if the display mode is the HDMI mode, the micro control unit 7 starts the back-stage mute circuit 8 to control the back-stage amplifier 6 to enter into the mute mode (step S43).

In view of the foregoing, it is known that the present invention can eliminate abnormal sound while the audio signal is changing. Additionally, the changing delay device can delay the changing time of the analog audio signal for preventing from generating a pop voice. The micro control unit controls the back-stage mute circuit to disable the speaker for preventing from generating declining voice while the stop button or the play button has been pushed.

Although the present invention has been explained in relation to its preferred embodiment, it is to be understood that many other possible modifications and variations can be made without departing from the scope of the invention as hereinafter claimed.

What is claimed is:

1. A circuit for eliminating abnormal sound, mounted in a display device connected to a digital video/audio player for playing a digital video/audio stream having a video signal and an audio signal, the circuit comprising:

a video/audio processor connected to an output end of the digital video/audio player for receiving the digital video/audio stream to perform decoding, wherein the video signal is transformed into an analog video signal, and the audio signal is transformed into a digital audio signal;

a digital to analog converter connected to the video/audio processor for transforming the digital audio signal into an analog audio signal;

a front-stage mute circuit connected to an output end of the digital to analog converter;

a changing delay device connected between the output end of the digital to analog converter and the input end of the front-stage mute circuit for delaying the changing of analog audio signal outputted by the digital to analog converter so as to use the front-stage mute circuit to filter out noise in the digital audio signal;

a front-stage amplifier connected to an output end of the front-stage mute circuit for outputting the analog audio signal of the front-stage mute circuit;

a back-stage amplifier connected to the output end of the front-stage amplifier;

a back-stage mute circuit connected to the back-stage amplifier and the micro control unit; and a micro control unit connected to the video/audio processor and the back-stage mute circuit for controlling the back-stage mute circuit;

wherein, as the digital video/audio stream begins changing of the video/audio processor, the video/audio processor sends an interrupt control signal to the micro control unit, and the micro control unit controls the back-stage mute circuit via interrupt for disabling the back-stage amplifier so as to enter in the mute mode.

2. The circuit as claimed in claim 1, wherein the changing delay device is a metal capacitor.

3. The circuit as claimed in claim 2, wherein an end of the metal capacitor connects between the output end of the digital to analog converter and the input end of the front-stage mute circuit, and the other end of the metal capacitor connects to the ground.

4. The circuit as claimed in claim 3, wherein the digital video/audio player is a DVD player.

5. The circuit as claimed in claim 4, wherein the digital video/audio stream conforms to the HDMI standard.

6. The circuit as claimed in claim 4, wherein the display device is a LCD TV, and the LCD TV further comprises a speaker to amplify the analog audio signal.

7. The circuit as claimed in claim 4, wherein as the digital video/audio player performs an operation of play, pause or image change, the digital video/audio stream of the video/audio processor is changing.

8. The circuit as claimed in claim 1, wherein the changing delay device delays the changing of the analog audio signal outputted by the digital to analog converter so as to make the front-stage mute circuit input a slow changing waveform to the front-stage amplifier.

* * * * *